US005729343A

United States Patent [19]
Aiyer

[11] Patent Number: 5,729,343
[45] Date of Patent: Mar. 17, 1998

[54] FILM THICKNESS MEASUREMENT APPARATUS WITH TILTING STAGE AND METHOD OF OPERATION

[75] Inventor: Arun A. Aiyer, Fremont, Calif.

[73] Assignee: Nikon Precision Inc., Belmont, Calif.

[21] Appl. No.: 734,958

[22] Filed: Oct. 22, 1996

Related U.S. Application Data

[63] Continuation-in-part of Ser. No. 559,544, Nov. 16, 1995, abandoned.

[51] Int. Cl.⁶ ................................................ G01B 9/02
[52] U.S. Cl. ................................................... 356/355
[58] Field of Search ................................. 356/355, 357

[56] References Cited

U.S. PATENT DOCUMENTS

| | | |
|---|---|---|
| 4,660,980 | 4/1987 | Takabayashi et al. . |
| 4,707,611 | 11/1987 | Southwell . |
| 4,899,055 | 2/1990 | Adams . |
| 5,034,617 | 7/1991 | Isobe . |
| 5,164,603 | 11/1992 | Hartman et al. . |
| 5,232,547 | 8/1993 | Drowley et al. . |
| 5,293,214 | 3/1994 | Ledger . |
| 5,333,049 | 7/1994 | Ledger ........................... 356/355 |
| 5,337,150 | 8/1994 | Mumola . |
| 5,381,234 | 1/1995 | Barbee et al. . |

FOREIGN PATENT DOCUMENTS

| | | |
|---|---|---|
| 0002107 | 1/1987 | Japan ........................... 356/355 |
| 62-134507 | 6/1987 | Japan . |
| 63-82306 | 4/1988 | Japan . |
| 4-35682 | 6/1992 | Japan . |
| 4-53362 | 8/1992 | Japan . |
| 5-45862 | 2/1993 | Japan . |
| 8-75661 | 3/1996 | Japan . |

OTHER PUBLICATIONS

"A novel micro-spot dielectric film thickness measurement system." Willenborg et al., SPIE Vol. 1594 Process Module Metrology, Control, and Clustering (1991) pp. 322–333.

*Primary Examiner*—Samuel A. Turner
*Attorney, Agent, or Firm*—Bennet K. Langlotz

[57] ABSTRACT

A film measurement apparatus having a stage with a support surface on which a substrate coated with a film may rest. An extended light source faces the stage, and an imager is aimed at the stage to capture the reflection of the light source. The imager includes a receiver upon which an image of at least an extended portion of the substrate may be generated, and a processor in communication with the imager is operable to calculate the thickness of the film at plurality of locations. The stage may be tilted to empirically measure an average illumination and the contrast between interference fringes, avoiding theoretical estimates provided by Fresnel' equation.

29 Claims, 2 Drawing Sheets

FILM THICKNESS MEASUREMENT APPARATUS WITH TILTING STAGE AND METHOD OF OPERATION

This application is a continuation-in-part of application Ser. No. 08/559,544, filed on Nov. 11, 1995, and now abandoned.

FIELD OF THE INVENTION

This invention relates to inspection apparatus and methods for thin film measurement, and more particularly to thin film reflectance techniques.

BACKGROUND AND SUMMARY OF THE INVENTION

The manufacture of semiconductor chips typically involves the repeated imaging of multiple pattern layers on a wafer. Each image is printed on a film or coating to generate the desired pattern. To provide high quality manufacturing to tight tolerances, it is desirable to monitor and control film thickness.

Current techniques for measuring the film thickness over an entire wafer require a multitude of sequential point-by-point thin film reflectance measurements to cover an extended area of the wafer. For each point, the wafer is positioned, the point is illuminated, and the resulting combined intensity of the first and second surface reflections is measured. Depending on the thickness of the film, the reflections may interfere constructively or destructively, so that the measured signal may fall within a range between maximum and minimum possible intensities.

To calculate the film thickness, it has been necessary to determine reflectance from the film surface and the substrate surface. This approach requires that the optical indices of the film and substrate materials be known or estimated. The indices are then used in Fresnel's equation to calculate normalized reflected intensity values for the particular materials. However, in practice, these indices may vary slightly due to manufacturing variations, introducing errors into the film thickness calculation.

The disclosed embodiments provide improvements over existing systems by providing a film measurement apparatus having a stage with a support surface on which a substrate coated with a film may rest. An extended light source faces the stage, and an imager is aimed at the stage to capture the reflection of the light source. The imager includes a receiver upon which an image of at least an extended portion of the substrate may be generated, and a processor in communication with the imager is operable to calculate the thickness of the film at a plurality of locations. The stage may be tilted to empirically measure an average illumination and the contrast between interference fringes, avoiding theoretical estimates provided by Fresnel's equation.

DETAILED DESCRIPTION OF A PREFERRED EMBODIMENTS

Figure 1:
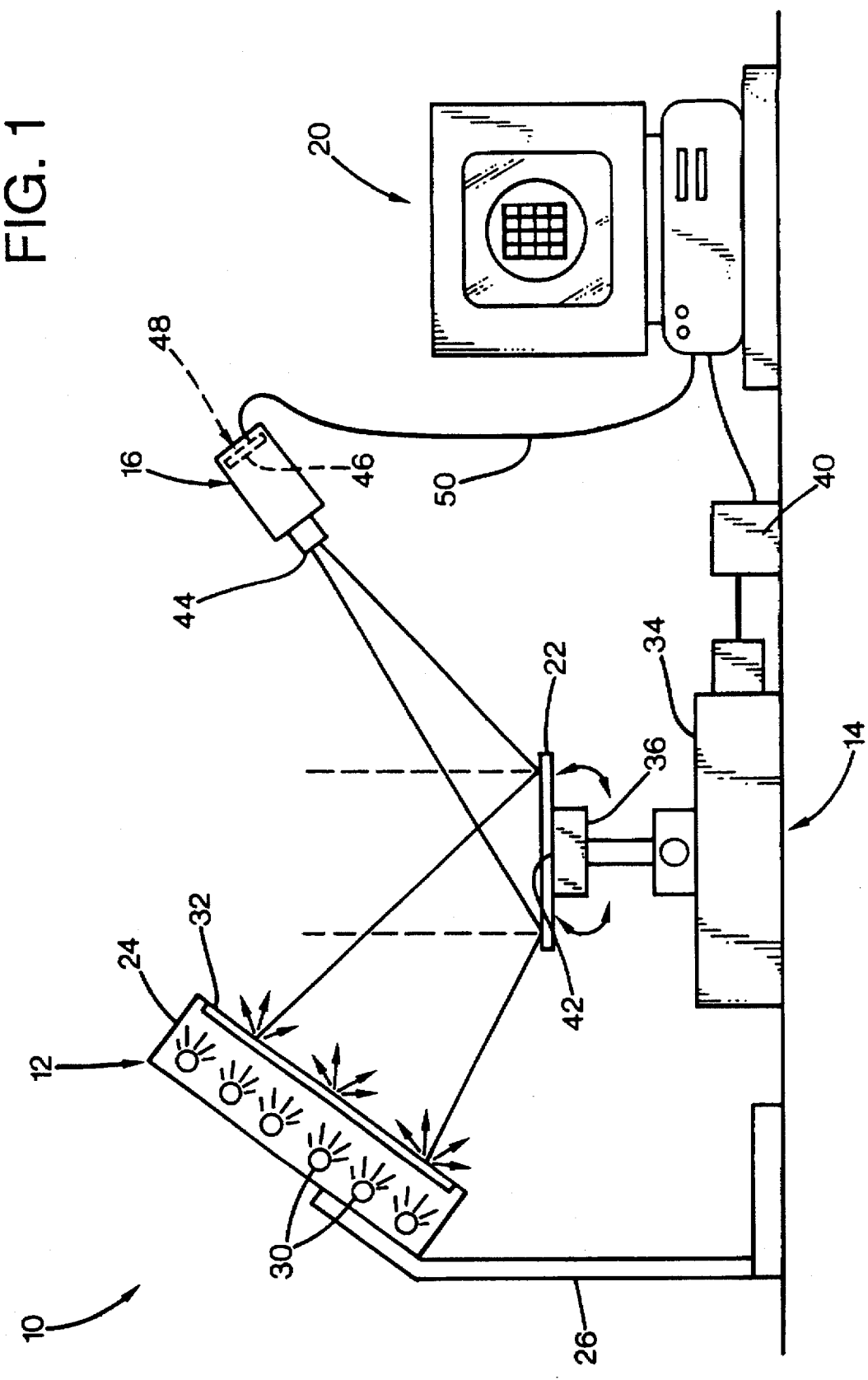
FIG. 1 is a simplified side view of an apparatus according to a preferred embodiment of the invention.

FIG. 1 shows a thin film measurement system 10 having a light source 12, a movable wafer support stage 14, a camera 16, and a computer 20. The light source 12 provides an extended diffuse source of substantially monochromatic light that shines downward onto a wafer 22 resting on the stage 14. The camera 16 is positioned on the opposite side of the stage from the light source so that it may view and record the image of the light source specularly reflected from the wafer. With the light source subtending a greater angle than the wafer as viewed from the camera, and being positioned at about the same angular elevation above the wafer surface as the camera, the entire surface of the wafer appears specularly illuminated to the camera.

The light source includes a box 24 mounted on a support 26. Six fluorescent tubes 30 individually filtered or coated to transmit primarily green and UV light in the manner of a "black light" are evenly arrayed within the box. A window 32 covers a square opening in a major face of the box, and is about 40 cm on each side. The window includes a diffuser plate providing 120 degrees diffusion with less than ±5% uniformity variation to eliminate potential hot spots for each light tube 30. The window also includes a green filter, preferably transmitting at 546 nm with a bandwidth of about 20 nm. The light source is tilted so that the window faces somewhat downward, with a line perpendicular to the center of the window intersecting the center of the wafer 22.

The stage 14 includes a base 34 and a motorized movable wafer support 36 connected to and controlled by the computer 20 via a motor controller 40. The wafer support may be tilted about an axis perpendicular to the plane of the figure to vary the angle of incidence of light from the light source and may be laterally translated relative to the base for proper positioning. The wafer support 36 has a flat upper surface 42 upon which the wafer rests. The upper surface may include a number of small holes connected to a vacuum pump (not shown) to selectably secure a wafer to the stage for measurement.

The camera 16 has a lens 44 that focuses an image of the wafer 22 onto a film plane 46 occupied by a CCD 48 having a matrix of pixels. The CCD converts the image of the illuminated wafer into a bit map of data, with each pixel being assigned an intensity value corresponding to the apparent level of illumination of a small point or region of the wafer. The bit map data is transmitted to the computer 20 via line 50, so that the computer may make calculations based on the data as will be discussed below, and store or display the results. The stage may be contained within a clean enclosure (not shown), with the light source and/or the computer positioned outside the enclosure to minimize contamination of the wafer.

Figure 2:
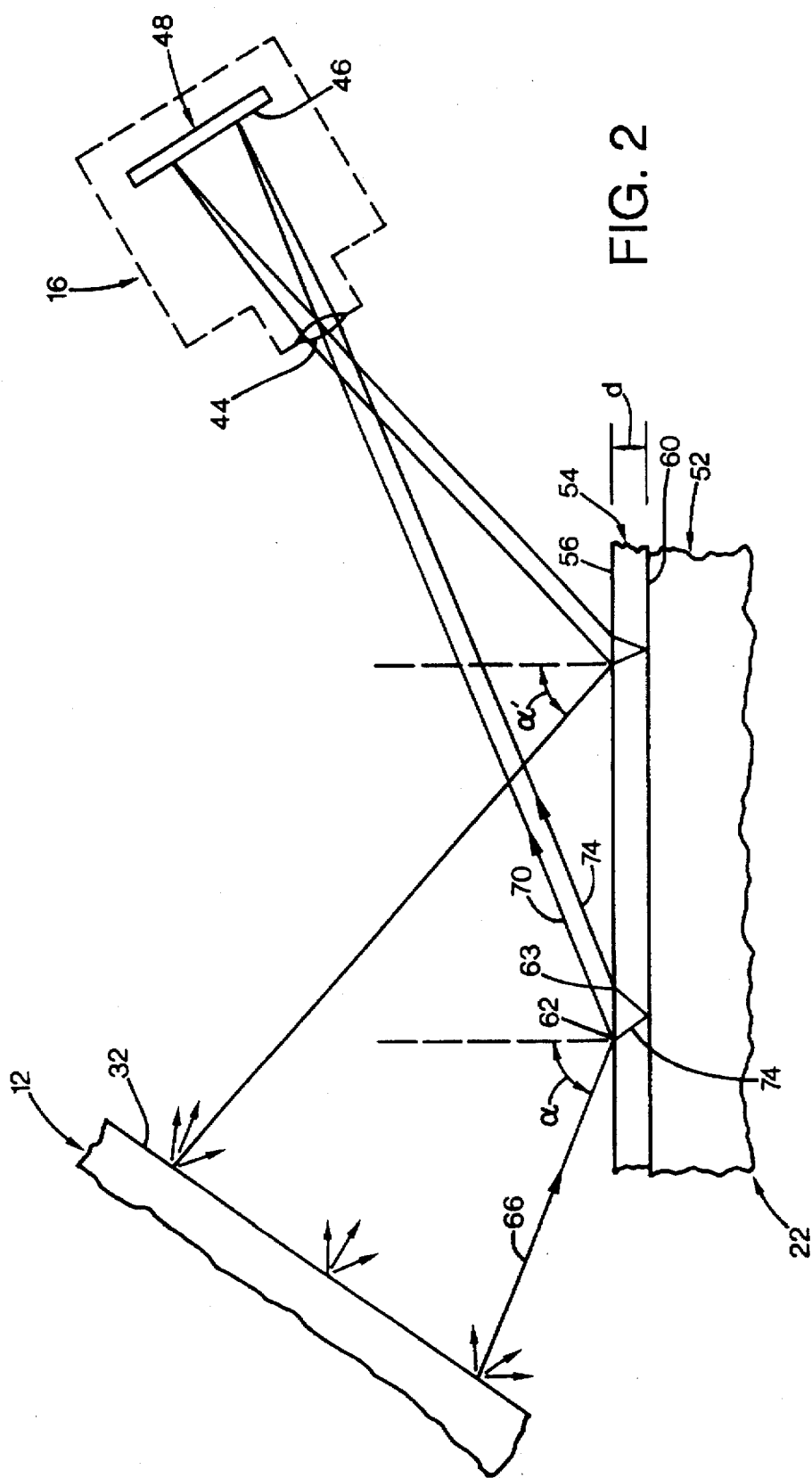
FIG. 2 is an enlarged sectional side view of the embodiment of FIG. 1.

As shown in FIG. 2, the wafer includes a substrate 52 coated with an optical film 54 of thickness "d". Examples of films that may be measured include photo-resist, polysilicon, $SiO_2$, metallic thin film, and the like. The film has an upper surface 56 and a lower surface 60 that directly contacts the substrate without an air gap. Both film surfaces 56 and 60 are sufficiently optically flat and smooth to provide a substantially specular reflection of incident light. Because the thickness may vary from point to point, it is necessary to measure the thickness at each point in a matrix of closely spaced points.

An exemplary point 62 on the film defines a normal line 64 perpendicular to the film. A first ray 66 from the light source 12 is incident on the film at angle "α" from normal to the surface, and is split into a reflected ray 70 and a refracted ray 74. The refracted beam 74 reflects off the film-substrate interface and exits the film's upper surface 56 at a point 63 that is laterally shifted from point 62 by a distance that is very small in comparison to the resolution of the CCD 48. Focused by lens 44, these two parallel rays combine at the image plane of the camera to form a point on a single pixel of the CCD 48.

With a film of local thickness "d" and having optical index "n", and illuminated by a beam of wavelength "$\lambda$" at an angle of incidence "$\alpha$", the resulting ray will have an intensity I, with $I_1$ being the intensity contributed if the light from the first ray 70 were measured alone, and $I_2$ being the intensity contributed if the light from the second ray 74 were measured alone. Due to interference effects, the value of the detected intensity I is not simply the sum of $I_1$ and $I_2$, but is a function of $I_1$, $I_2$, $\alpha$, d, and $\lambda$:

$$I=I_1+I_2+2(I_1 I_2)^{1/2} \cos[(4\pi/\lambda)d(n^2-\sin^2\alpha)^{1/2}]$$

To solve for thickness d, it is necessary to experimentally determine the values of $I_1$ and $I_2$, since these can not be independently discerned within the combined beam. Also, the index n must be experimentally determined or known.

To determine these values such that d may be established as a function of I, an initial experiment is conducted for each wafer. Since the indices of refraction of the film and substrate do not vary appreciably over a single wafer, a only a limited portion of the wafer need be tested. The wafer is illuminated normally by the light source, and tilted through a range of angles as the reflected intensity from the tested portion is monitored and recorded. The intensity varies with angle due to the interference between the ray components. The intensity function yields a periodic cosine squared curve with maxima corresponding to constructive interference, and minima corresponding to destructive interference.

An average is taken of the minima and maxima to calculate a DC component providing the $I_1+I_2$ terms noted in the intensity equation above:

$$I_1+I_2=1/2(I_{max}+I_{min}).$$

A contrast or fringe visibility factor V is calculated as:

$$V=(I_{max}-I_{min})/(I_{max}+I_{min}).$$

The factor:

$$2(I_1 I_2)^{1/2}$$

in the intensity equation above is solvable, as it is equal to the DC component multiplied by V.

The phase factor in the intensity equation is:

$$\cos[(4\pi/\lambda)d(n^2-\sin^2\alpha)^{1/2}].$$

Thus, having measured $I_{max}$ and $I_{min}$, d may be calculated for each point or pixel on the wafer as a function of the I measured by each pixel of the CCD.

For applications in which the film thickness may be greater than $\lambda$, multiple fringes will be generated, and is will be necessary to determine the order of the fringe being measured.

The integral fringe order m is derived from the equation:

$$n^2=[m^2(\sin^2\alpha_1-\sin^2\alpha_2)+2m\sin^2\alpha_1+\sin^2\alpha_1]/(2m+1),$$

where $\alpha_1$ and $\alpha_2$ are the incidence angles corresponding to two adjacent intensity minima measured as the wafer is tilted.

The wafer is returned to the horizontal position so that the entire surface, or at least any portion desired to be measured, is reflecting an image of the light source. The CCD then essentially simultaneously records an I value for each pixel, or makes the recording in a rapid raster or comparable sequence without movement of the wafer or any of the other system components.

The total thickness at a given point is:

$$d=(m+\epsilon)\lambda/2[n^2-\sin^2\alpha]^{1/2}.$$

The fractional fringe order $\epsilon$ is given by:

$$\epsilon=[1/(2\pi)]\cos^{-1}[(I-[I_1+I_2])/(2(I_1 I_2)^{1/2})]$$

The $\alpha$ value for each pixel may be preestablished and mapped when the system is set up and calibrated, since the camera does not translate relative to the stage, and the stage may returned to the same horizontal position for each wafer tilt.

The computer calculates the thickness of the film for each corresponding pixel, using the $I_{max}$ and $I_{min}$ levels determined experimentally for the wafer being measured, and using the $\alpha$ value map established for each pixel in the given setup. The resulting thickness data may be displayed or stored by the computer, and used to correct the film manufacturing process, or to reject certain out of tolerance regions of wafers produced by the process.

In the preferred embodiment, the stage 14 and motor controller are units from Velmex, of East Bloomfield, N.Y. In an alternative embodiment, the extended diffuse light source may be replaced by an extended collimated light source, such as a laser beam projected through a diverging lens, to a large fresnel lens having a focal point coincident with the focal point of the diverging lens, in the manner of a Newtonian or Keplerian telescope.

While the invention is described in terms of a preferred embodiment, the following claims are not intended to be so limited.

I claim:

1. A film measurement apparatus comprising:
    a stage having a support surface on which a substrate coated with a film may rest;
    an extended light source facing the stage;
    an imager aimed at the stage and having a receiver upon which an image of at least an extended portion of the substrate may be generated;
    a tilting mechanism connected to the stage and operable to tilt the film through a range of angular dispositions; and
    a processor in communication with the imager and operable to calculate the thickness of the film at a plurality of locations, the processor being operably connected to the tilting mechanisms.

2. The apparatus of claim 1 wherein the stage defines a planar surface, and wherein the light source and imager occupy the same side of the surface, and on opposite sides of a line normal to the surface, such that light emitted by the source reflects off the film to the imager.

3. The apparatus of claim 1 wherein the stage is moveable.

4. The apparatus of claim 1 including a first filter transmissive of a limited first range of light wavelengths, and movable to a position in an optical path that extends from the light source, off of the stage, and to the imager.

5. The apparatus of claim 1 wherein the light source is at least 5 cm across, such that a significant area of a film may be measured in a single operation.

6. The apparatus of claim 1 wherein the light source includes a filter.

7. The apparatus of claim 1 wherein the light source includes a diffuser.

8. The apparatus of claim 1 wherein the imager is a camera having a receptor and a lens operable to focus an image of at least an extended portion of the substrate onto the receptor.

9. The apparatus of claim 8 wherein the receptor is an array of a multitude of pixels electronically connected to the processor.

10. The apparatus of claim 1 wherein the imager is sufficiently large to receive an image of the entire stage surface.

11. A method of measuring the thickness of an extended optical film on a substrate comprising the steps:

illuminating the film with an extended source of light;

reflecting the light off the film to an imager;

tilting the film through a range of angular dispositions;

generating a first image of the reflected light at a first range of wavelengths while tilting the film;

converting the image to numerical data;

processing the data to calculate a plurality of film thickness estimates for a plurality of locations on the film.

12. The method of claim 11 wherein generating the first image comprises filtering the light to a first range of wavelengths.

13. The method of claim 11 wherein generating the first image comprises simultaneously measuring the intensity of light reflected from a plurality of locations on the fill.

14. The method of claim 11 including, while illuminating at least an extended portion of the film, determining a baseline illumination intensity.

15. The method of claim 14 wherein determining the baseline illumination intensity includes calculating an average intensity.

16. The method of claim 14 wherein determining the baseline illumination intensity includes moving the fill.

17. The method of claim 11 including tilting the film while generating a sequence of images, each at a different tilt angle.

18. The method of claim 16 including measuring a minimum and maximum intensity while moving the film.

19. The method of claim 14 including measuring baseline, minimum, and maximum illumination intensities while maintaining the fill in a stationary position and moving the light source and imager to generate the first image.

20. The method of claim 17 wherein illuminating the fill includes emitting light toward the fill and diffusing the light.

21. A method of measuring the thickness of an extended optical film on a substrate comprising the steps:

illuminating the film with a source of light;

while illuminating the at least a first portion of the film, determining a baseline illumination intensity;

reflecting the light off the film to an imager;

while reflecting light off the film, changing the relative angular disposition of the film and the imager;

generating a first image of the reflection at a first range of wavelengths;

converting the images to numerical data;

processing the data to calculate a plurality of film thickness estimates for a plurality of locations on the film.

22. The method of claim 21 wherein generating the first image comprises filtering the light to a first range of wavelengths.

23. The method of claim 21 wherein generating the first image comprises simultaneously measuring the intensity of light reflected from a plurality of locations on the film.

24. The method of claim 21 wherein determining the baseline illumination intensity includes calculating an average intensity.

25. The method of claim 21 wherein determining the baseline illumination intensity includes moving the fill.

26. The method of claim 25 wherein moving the film includes tilting the film.

27. The method of claim 26 including measuring a minimum and maximum intensity while moving the film.

28. The method of claim 27 including measuring baseline, minimum, and maximum illumination intensifies while maintaining the fill in a stationary position and moving the light source and imager to generate the first image.

29. The method of claim 27 wherein illuminating the film includes emitting light toward the film and diffusing the light.

\* \* \* \* \*